M. W. STOMS.
CONDENSER.
APPLICATION FILED JULY 1, 1921.

1,434,458.

Patented Nov. 7, 1922.
3 SHEETS—SHEET 2.

INVENTOR
Marion W. Stoms.
BY
ATTORNEY

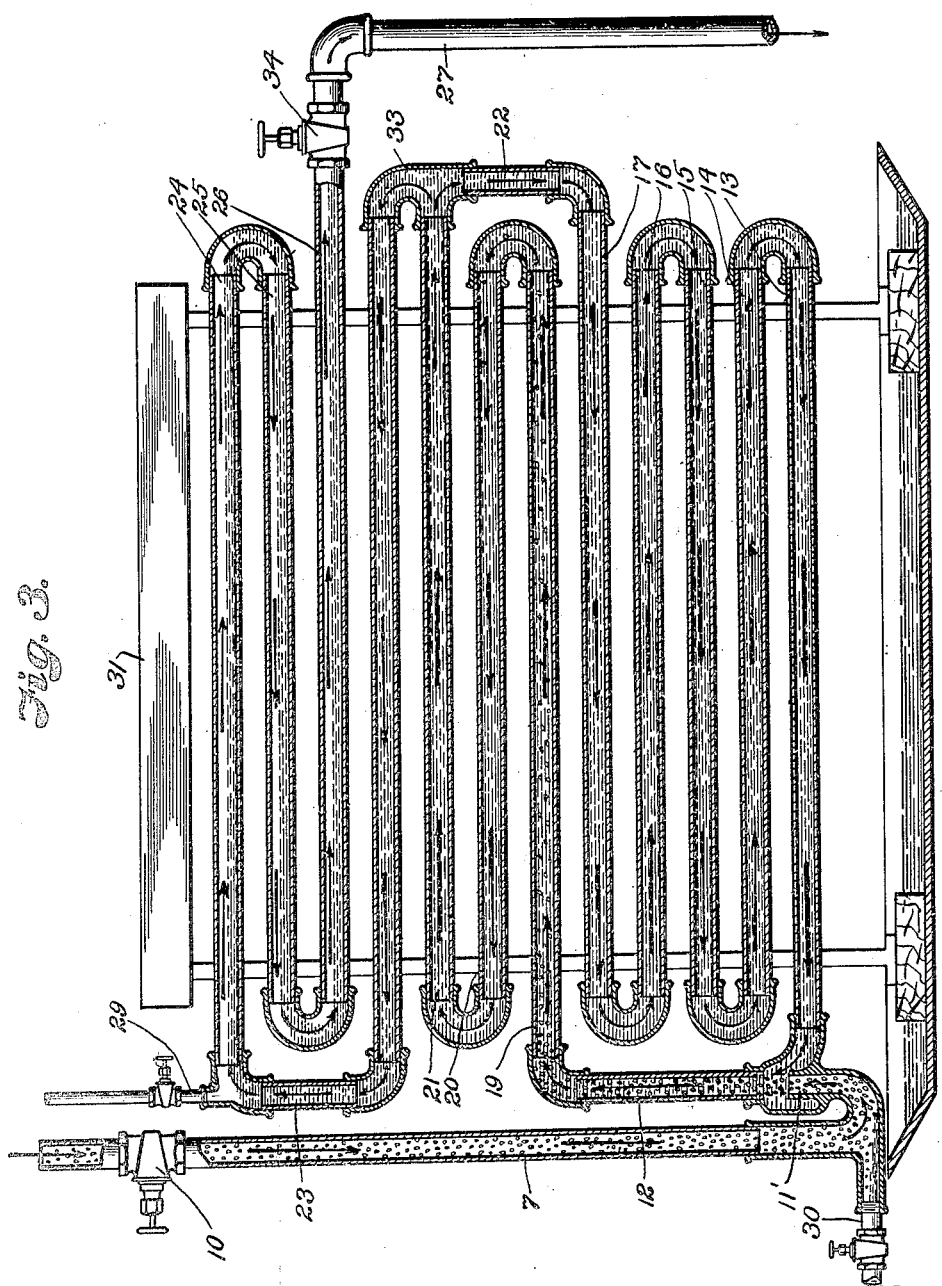

Patented Nov. 7, 1922.

1,434,458

UNITED STATES PATENT OFFICE.

MARION W. STOMS, OF KANSAS CITY, MISSOURI, ASSIGNOR OF ONE-HALF TO LEIGH W. MORRIS, OF KANSAS CITY, MISSOURI.

CONDENSER.

Application filed July 1, 1921. Serial No. 481,329.

*To all whom it may concern:*

Be it known that I, MARION W. STOMS, a citizen of the United States, residing at Kansas City, in the county of Jackson and State of Missouri, have invented certain new and useful Improvements in Condensers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a refrigerating apparatus and particularly to a condenser for converting a refrigerant from a gaseous phase to a liquid phase.

The condenser is so constructed that there will be a constant supply of available refrigerant in the liquid phase to entrain or co-mingle with refrigerant in the gaseous phase so that the refrigerant in the gaseous phase will readily condense into the body of its own liquid which has been previously cooled and be thereby rendered available for introduction into an evaporator in the room or about the zone in which the temperature is to be reduced.

The condenser comprises a unit consisting of a plurality of pipes horizontally superposed one above the other and sub-divided into a flooded section or liquid reservoir, a condenser section and a final cooling section, from the bottom toward the top in the order named and if desired I may arrange at the lowermost point in the unit a pre-cooling section for the refrigerant in the gaseous phase so that its temperature will be reduced before it combines with the refrigerant in the liquid phase and thereby more readily condense.

I have arranged the various pipes or sections of the unit in horizontal, vertical alignment and I prefer to provide an upward flow so that the cooling pipes containing the refrigerant for the final cooling will be next to the condensing water at its source and thereby be able to avail itself of the lowest temperature of the cooling water, thereby reducing the refrigerant to substantially the temperature of the cooling water before it enters into the receiver or before it enters into the evaporator.

The novel construction of the invention will be specifically described hereinafter, reference being had to the accompanying drawings, in which—

Fig. 3 is a similar view of a slightly modified form of unit.

In order to comprehensibly describe the invention I have shown part of a simple form of refrigerating plant.

Figure 1:
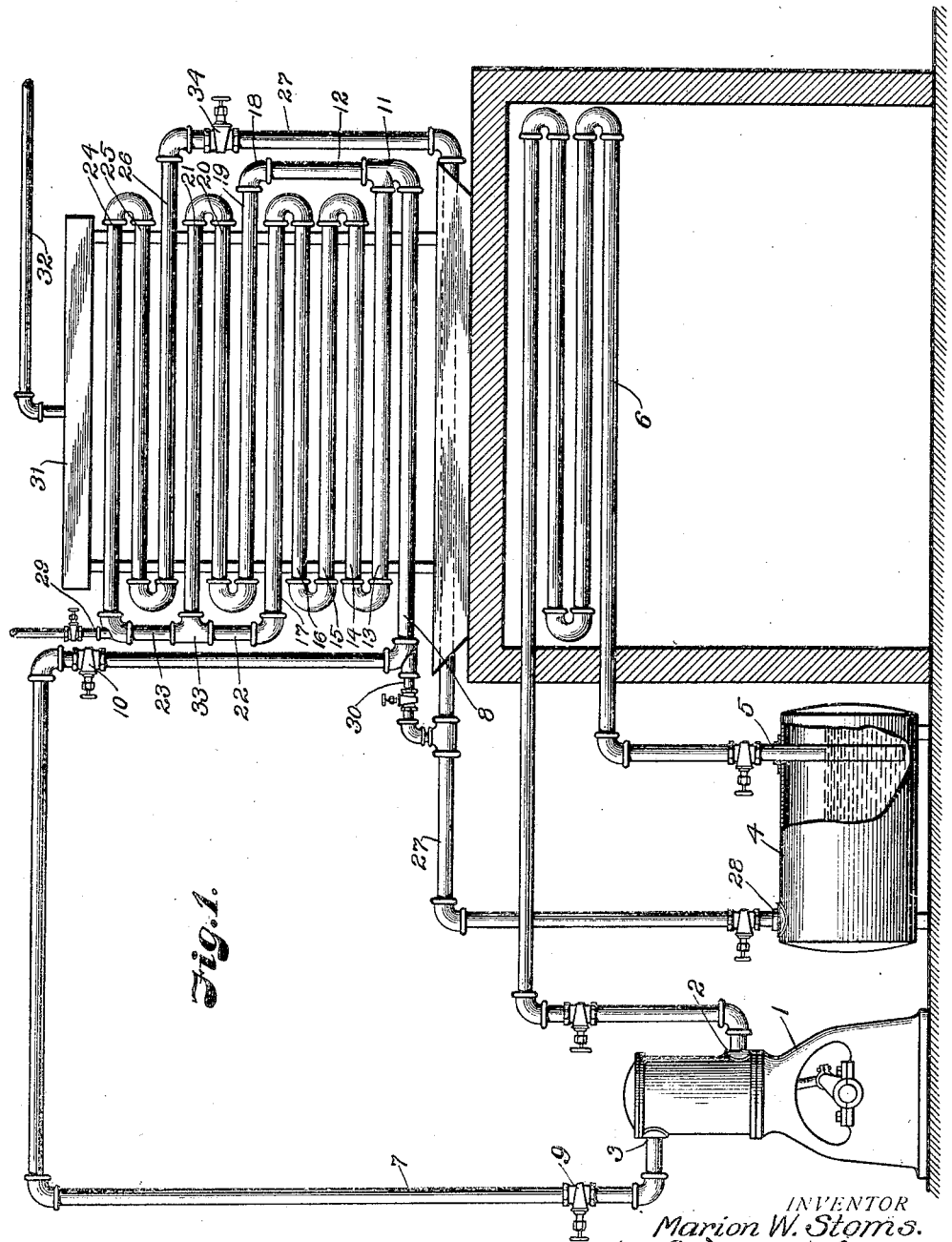
Fig. 1 is an elevational view of a refrigerating plant constructed in accordance with my invention.

Referring to Fig. 1, 1 designates a gas compressor having an inlet at 2 and an outlet at 3. 4 is a receiver or refrigerant reservoir to receive the refrigerant in the liquid phase. 5 is a discharge for the receiver communicating with the evaporator coils 6, which discharge into the compressor through the inlet 2. The liquid is drawn through the coils 6, absorbing the heat in the usual way and becoming automatically converted from a liquid phase into a gaseous phase in which state it enters the compressor 1. The compressed gas is discharged through the port 3 into a pipe 7, which communicates with a gas pre-cooling section or pipe 8 of the unit, there being stop valves 9 and 10 shown for the pipe 7, which may be used to close off communication through said pipes.

The gas pre-cooling pipe 8 terminates in a directional flow nozzle 11 which discharges into a pipe 12, the lower end of which is in communication with the flooded section of the condenser consisting of the pipes 13, 14, 15, 16 and 17. The top end 18 of the pipe 12 communicates with the lower pipe 19 of the condenser section, the condenser being shown as consisting of the pipe 12, the pipe 19 and the pipes 20 and 21. The top of the condenser, that is, the pipe 21, communicates with the top pipe 17 of the flooded section or reservoir through the medium of a pipe 22 where the refrigerant in the liquid phase divides and the amount of liquid equal to that which has been condensed from the gaseous phase to the liquid phase will pass upwardly through the pipe 23 to the top of the final cooling section of the condenser consisting of the pipes 24, 25 and 26 and discharge through the flow pipe 27, having its discharge connected to the intake 28 of the receiver 4. The final cooling section may be provided with a purge pipe 29, as will be well understood and a drain 30 may be provided for the gas section 8 so that the condenser may be drained and the contents may flow into pipe 27 and pass into the receiver 4.

Above the unit or condenser is a source of cooling liquid supply 31, which may be an elongated trough supplied by a suitable pipe 32, through which the cooling liquid, for example, water, may fill the trough and flow over the pipes as is common practice with surface condensers.

By reference to the drawings it will be seen that when the gas leaves the pipe 8, the nozzle 11 will direct its flow into the pipe 12 where it will combine with the refrigerant in a liquid phase and since the liquid refrigerant will have an affinity for the gaseous refrigerant, the two will combine and due to the lift, on account of the fact that the gas and liquid will be lighter than liquid alone, the entrained gas and liquid will rise in the pipe 12, at which time the major portion of the condensation of the gaseous refrigerant will take place but any retarded condensation is provided for by the pipes 19, 20 and 21 so that by the time the entrained gas reaches the two-way fitting or coupling 33, all of the refrigerant will be in the liquid phase and an amount of the liquid refrigerant equal to that which has been discharged through the pipe 13 will pass back into the pipe 21 and into the flooded section or reservoir of the condenser. The amount represented by the gaseous refrigerant which has been converted into liquid phase will pass up into the pipe 24 of the final cooling stage where it will reach its lowest temperature before passing into the pipe 27.

It is to be understood that the passage of the entrained gas is progressively upward so that some heat is absorbed by the cooling water at the bottom but the cooling water becomes progressively cooler toward the top, this being an important feature since it is desirable to have the refrigerant at the lowest temperature at the time it enters the receiver, which would not be the case if the gas entered pipe 24 first and progressively passed downward.

When the liquid reaches the receiver 4 it will pass through pipe 5, as previously described, through the evaporator coil 6, where it will cool the atmosphere and change from a liquid to a gaseous phase, as is well understood, and then back to the compressor, completing the cycle of operation so that it must again be compressed and passed through the unit in order to perform useful work.

It will be noticed that the flooded section has its discharge communicating with the bottom of the condenser and its intake communicating with the discharge of the condenser, the discharge from the flooded section being a fractional part of the fluid entering the condenser and the final discharge from the condenser being the whole amount entering the condenser from the flooded section plus that amount of liquid which has been condensed from a gaseous phase supplied to the pipe 8.

Attention is also called to the fact that by arranging the final cooling section above the condenser section and the flooded section below the top of the condenser section, the liquid in the flooded section cannot be caused to flow into the receiver 4 because the entrance to the final cooling section is above both the condenser and the flooded section. Therefore, the liquid cannot be drawn from the flooded section by any demand which may be made on the pipe 27. This is an important feature of the invention since it insures that the flooded section will always be substantially full of refrigerant in the liquid phase, ready to combine with incoming gas supplied from the compressor side of the compressor 1. The pipe 27 may be supplied with a cut-off valve 34.

Figure 2:
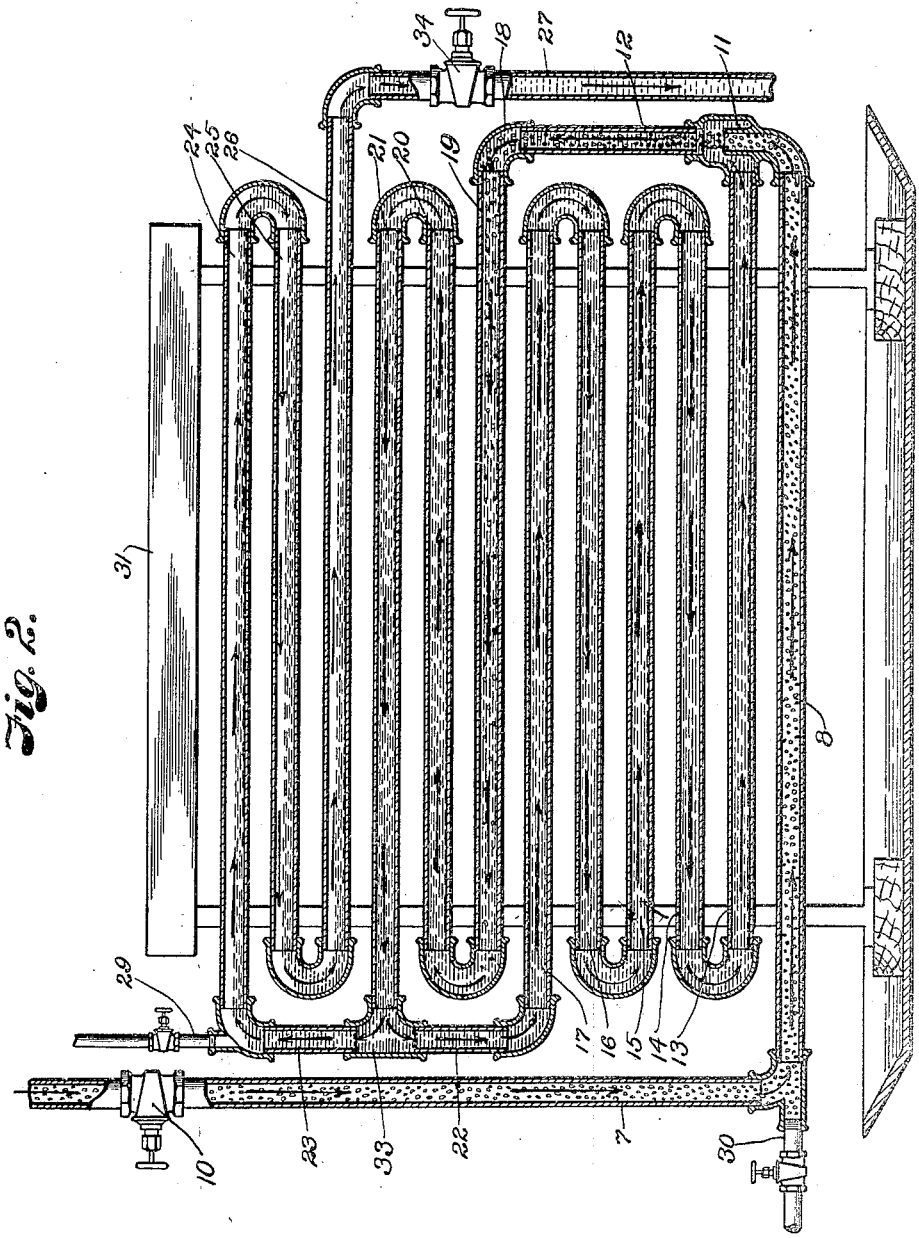
Fig. 2 is a vertical, longitudinal, sectional view through the unit.

In Fig. 3 I have shown a modified form of condenser in which a pre-cooler pipe for the gas unit in which and the directional flow nozzle 11' is omitted and is connected directly with the pipe 7 and enters the manifold 12, receiving liquid from the pipe 13 and delivering it with the entrained gas to the pipe 19. In other respects, the form of condenser shown in Fig. 3 is approximately like that shown in Fig. 2.

What I claim and desire to secure by Letters-Patent is:

1. A condenser for refrigerators comprising a plurality of connected pipes in the form of a coil, divided into communicating sections, one of which is a flooded section, one a condenser section and the remaining one a final cooling section arranged from the bottom to the top in the order named, the flooded section having its discharge communicating with the bottom of the condenser section and its intake communicating with the top of the condenser section and the intake for the final cooling section communicating with the top of the condenser section and means for maintaining the liquid level in the flooded section constant.

2. A condensing unit for a refrigerating apparatus comprising a coil of pipes divided into a pre-cooling gas section, a flooded section, a condensing section and a final cooling section, the gas section communicating with the discharge from the flooded section the condensing section and the top of the condensing section communicating with the top of the flooded section and having a divided connection for communicating with the final cooling section, and a pipe for connection with an evaporator communicating with the top of the condenser section through the final cooling section.

3. A condenser for a refrigerating apparatus comprising a plurality of coiled, connected pipes divided into a constantly flooded section, a condenser section and a final cooling section, a gas pipe communicating with the intake for the condenser section at the point at which the flooded section communicates with the intake of the condenser section, said point being located in the bottom of the condenser section, the condenser communicating with the final cooling section and with the flooded section at its top, and an evaporator pipe connected to the final cooling section.

4. A condenser unit for refrigerating machines comprising a plurality of coils of pipes connected together to provide a constantly flooded section in the bottom, a final cooling section at the top and a condenser section intermediate the two and connected therewith so that the discharge from the flooded section will enter the bottom of the condenser section and the discharge from the condenser section will enter the final cooling section, means for maintaining the liquid level in the flooded section constant and means for directing cooling water over the top of the unit to permit it to gravitate to the bottom thereof.

5. A condenser unit comprising a pipe for conveying refrigerant in a gaseous phase, a constantly flooded reservoir section having its discharge adjacent to the discharge of the pipe for conveying the refrigerant in a gaseous phase, a pipe into which the pipe for the gaseous phase and the refrigerant from the flooded section in liquid phase enters, a condenser into which the said pipe discharges to convey the product of the combined gaseous and liquid refrigerants, a final cooling section, a connection between the top of the condenser and the constantly flooded section and the final cooling section whereby the flow from the condenser may divide into two portions, and means for directing cooling water over the unit.

6. A condenser unit comprising a pipe for conveying refrigerant in a gaseous phase, a constantly flooded reservoir section having its discharge adjacent to the discharge of the pipe for conveying the refrigerant in a gaseous phase, a pipe into which the pipe for the gaseous phase and the refrigerant from the flooded section in liquid phase enters, a condenser into which the said pipe discharges to convey the product of the combined gaseous and liquid refrigerants, a final cooling section, a connection between the top of the condenser, the constantly flooded section and the final cooling section whereby the flow from the condenser may divide into two portions, means for directing cooling water over the unit, and an evaporator pipe connected to the final cooling stage above the condenser.

In testimony whereof I affix my signature.

MARION W. STOMS.